United States Patent [19]
Leshem

[11] Patent Number: 5,787,265
[45] Date of Patent: Jul. 28, 1998

[54] BUS ARBITRATION SYSTEM HAVING A PAIR OF LOGIC NETWORKS TO CONTROL DATA TRANSFER BETWEEN A MEMORY AND A PAIR OF BUSES

[75] Inventor: Eli Leshem, Brookline, Mass.

[73] Assignee: EMC Corporation, Hopkinton, Mass.

[21] Appl. No.: 534,376

[22] Filed: Sep. 28, 1995

[51] Int. Cl.$^6$ ............................................. H01J 13/00
[52] U.S. Cl. .................... 395/293; 395/306; 395/308; 395/309; 395/287; 395/847
[58] Field of Search .......................... 395/306, 308, 395/309, 293, 292, 299, 840, 841, 858, 287, 295, 302, 863, 878, 473, 468, 470, 200.68, 200.69, 311, 312

[56] References Cited

U.S. PATENT DOCUMENTS

| | | | |
|---|---|---|---|
| 5,398,324 | 3/1995 | Matida et al. | 395/425 |
| 5,475,859 | 12/1995 | Kamabayashi et al. | 395/825 |
| 5,483,642 | 1/1996 | Okazawa et al. | 395/306 |
| 5,509,127 | 4/1996 | Datwyler et al. | 395/308 |
| 5,577,230 | 11/1996 | Argade et al. | 395/477 |
| 5,584,040 | 12/1996 | Curt et al. | 395/827 |
| 5,594,926 | 1/1997 | Chang et al. | 395/872 |
| 5,619,726 | 4/1997 | Seconi et al. | 395/842 |
| 5,640,600 | 6/1997 | Satoh et al. | 395/853 |
| 5,644,729 | 7/1997 | Amini et al. | 395/250 |
| 5,659,709 | 8/1997 | Quach | 395/473 |

Primary Examiner—Ayaz R. Sheikh
Assistant Examiner—Raymond N. Phan
Attorney, Agent, or Firm—Fish & Richardson, P.C.

[57] ABSTRACT

A computer/disk storage system is provided for enabling data to be transferred between a memory and either one of a pair of buses. The system includes a pair of logic networks. The first logic network is adapted to enable data to be transferred between the memory and a first one of the buses in response to a first bus availability signal. The first logic network also provides a second bus availability signal indicating when the memory is available to transfer data between such memory and the second one of the buses. A second logic network is adapted to enable data to be transferred between the memory and the second one of the buses in response to the second bus availability signal. The second logic network also provides the first bus availability signal indicating when the memory is available to transfer data between such memory and the second one of the buses. A clock pulse generator is provided having a pair of oscillators and a network for producing clock pulses on an output of the pulse generator from one of the pair of oscillators and when such one of the pair of oscillators becomes defective, producing such clock pulses on such output from the other one of the pair of oscillators. The network includes a multiplexer having: a first input fed a first one of the pair of oscillators; a second input fed the other one of the pair of oscillators; and, a control signal input fed by a control signal. The multiplexer feeds signals from either the first oscillator or the second oscillator to an output of the multiplexer selectively in accordance with the control signal.

13 Claims, 5 Drawing Sheets

BUS ARBITRATION SYSTEM HAVING A PAIR OF LOGIC NETWORKS TO CONTROL DATA TRANSFER BETWEEN A MEMORY AND A PAIR OF BUSES

BACKGROUND OF THE INVENTION

This invention relates generally to data storage systems, and more particularly to data storage systems having redundancy arrangements to protect against total system failure in the event of a failure in a component or subassembly of the storage system.

As is known in the art, large mainframe computer systems require large capacity data storage systems. These large main frame computer systems generally includes data processors which perform many operations on data introduced to the computer system through peripherals including the data storage system. The results of these operations are output to peripherals, including the storage system.

One type of data storage system is a magnetic disk storage system. Here a bank of disk drives and the main frame computer system are coupled together through an interface. The interface includes CPU, or "front end", controllers and "back end" disk controllers. The interface operates the controllers in such a way that they are transparent to the computer. That is, data is stored in, and retrieved from, the bank of disk drives in such a way that the mainframe computer system merely thinks it is operating with one mainframe memory. One such system is described in U.S. Pat. No. 5,206,939, entitled "System and Method for Disk Mapping and Data Retrieval", inventors Moshe Yansi, Natan Vishlitzky, Bruno Altersu and Daniel Castel, issued Apr. 27, 1993, and assigned to the same assignee as the present invention.

As described in such U.S. Patent, the interface may also include, in addition to the CPU controllers and disk controllers, a cache memory. The cache memory is a semiconductor memory and is provided to rapidly store data from the main frame computer system before storage in the disk drives, and, on the other hand, store data from the disk drives prior to being sent to the main frame computer. The cache memory being a semiconductor memory, as distinguished from a magnetic memory as in the case of the disk drives, is much faster than the disk drives in reading and writing data.

The CPU controllers, disk controllers and cache memory are interconnected through a backplane printed circuit board. More particularly, disk controllers are mounted on disk controller printed circuit boards. CPU controllers are mounted on CPU controller printed circuit boards. And, cache memories are mounted on cache memory printed circuit boards. The disk controller, CPU controller and cache memory printed circuit boards plug into the backplane printed circuit board. In order to provide data integrity in case of a failure in a controller, the backplane printed circuit board has a pair of buses. One set the disk controllers is connected to one bus and another set of the disk controllers is connected to the other bus. Likewise, one set the CPU controllers is connected to one bus and another set of the CPU controllers is connected to the other bus. The cache memories are connected to both buses.

Thus, the use of two buses provides a degree of redundancy to protect against a total system failure in the event that the controllers, or disk drives connected to one bus fail.

SUMMARY OF THE INVENTION

In accordance with one feature of the present invention, a computer/disk storage system is provided for enabling data to be transferred between a memory and either one of a pair of buses. The system includes a pair of logic networks. The first logic network is adapted to enable data to be transferred between the memory and a first one of the buses in response to a first bus availability signal. The first logic network also provides a second bus availability signal indicating when the memory is available to transfer data between such memory and the second one of the buses. A second logic network is adapted to enable data to be transferred between the memory and the second one of the buses in response to the second bus availability signal. The second logic network also provides the first bus availability signal indicating when the memory is available to transfer data between such memory and the first one of the buses.

In accordance with another feature of the invention, a clock pulse generator is provided having a pair of oscillators and a network for producing clock pulses on an output of the pulse generator from one of the pair of oscillators and when such one of the pair of oscillators becomes defective, producing such clock pulses on such output from the other one of the pair of oscillators. The network includes a multiplexer having: a first input fed a first one of the pair of oscillators; a second input fed the other one of the pair of oscillators; and, a control signal input fed by a control signal. The multiplexer feeds signals from either the first oscillator or the second oscillator to an output of the multiplexer selectively in accordance with the control signal.

In a preferred embodiment, a network is provided for coupling one of the first one of the pair of oscillators to the output of the multiplexer to produce the clock signals and when such one of the first one of the pair of oscillators is defective producing the control signal to decouple the first one of the pair of oscillators from the output of the multiplexer and to couple the other one of the pair of oscillators to the output of the multiplexer to provide the clock pulses. The network includes a circuit for detecting a defect in one of the oscillators and for producing the control signal in response to the detected defect.

BRIEF DESCRIPTION OF THE DRAWINGS

Referring now to the accompanying drawings:

FIG. 3A-3G are a series of timing diagrams useful in understanding the bus arbitration system of FIG. 2 when clock pulses used therein at in-phase with each other.

FIG. 5A-5G are a series of timing diagrams useful in understanding the bus arbitration system of FIG. 2 when clock pulses used therein are out-of-phase with each other.

DESCRIPTION OF THE PREFERRED EMBODIMENT

Figure 1:
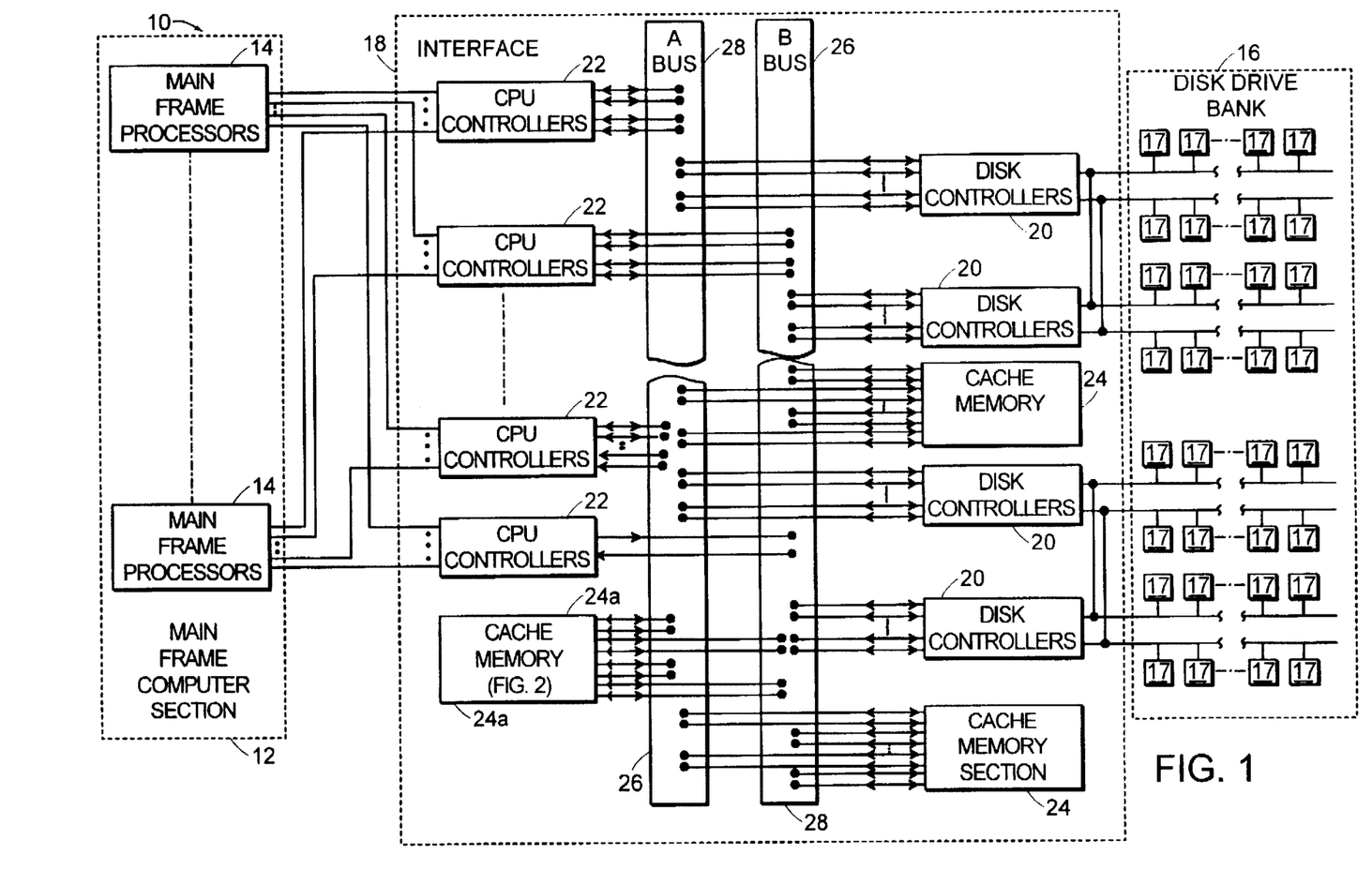
FIG. 1 is a block diagram of a computer system having an interface for providing coupling between main frame computer processors and a bank of disk storage devices according to the invention.

Referring now to FIG. 1, a computer system 10 is shown. The computer system 10 includes a main frame computer section 12 having main frame processors 14 for processing data. Portions of the processed data are stored in, and retrieved data from, a bank 16 of disk drives 17 through an interface 18.

The interface 18 includes disk controllers 20, central processor unit (CPU) controllers 22 and cache memories 24 electrically interconnected through a pair buses; here, an A bus 28 and a B bus 26. More particularly, in order to provide data integrity in case of a failure in a disk controller 20 or CPU controller 22, a pair of buses 26, 28 is provided. One portion of the disk controllers 20 is connected to one of the buses 26, 28 and the other portion of the disk controllers 20 is connected to the other one of the buses 26, 28. Likewise, one portion of the CPU controllers 22 is connected to one of the buses 26, 28 and the other portion of the CPU controllers 22 is connected to the other one of the buses 26, 28. The cache memories 24 are connected to both buses 26, 28, as shown.

Figure 2:
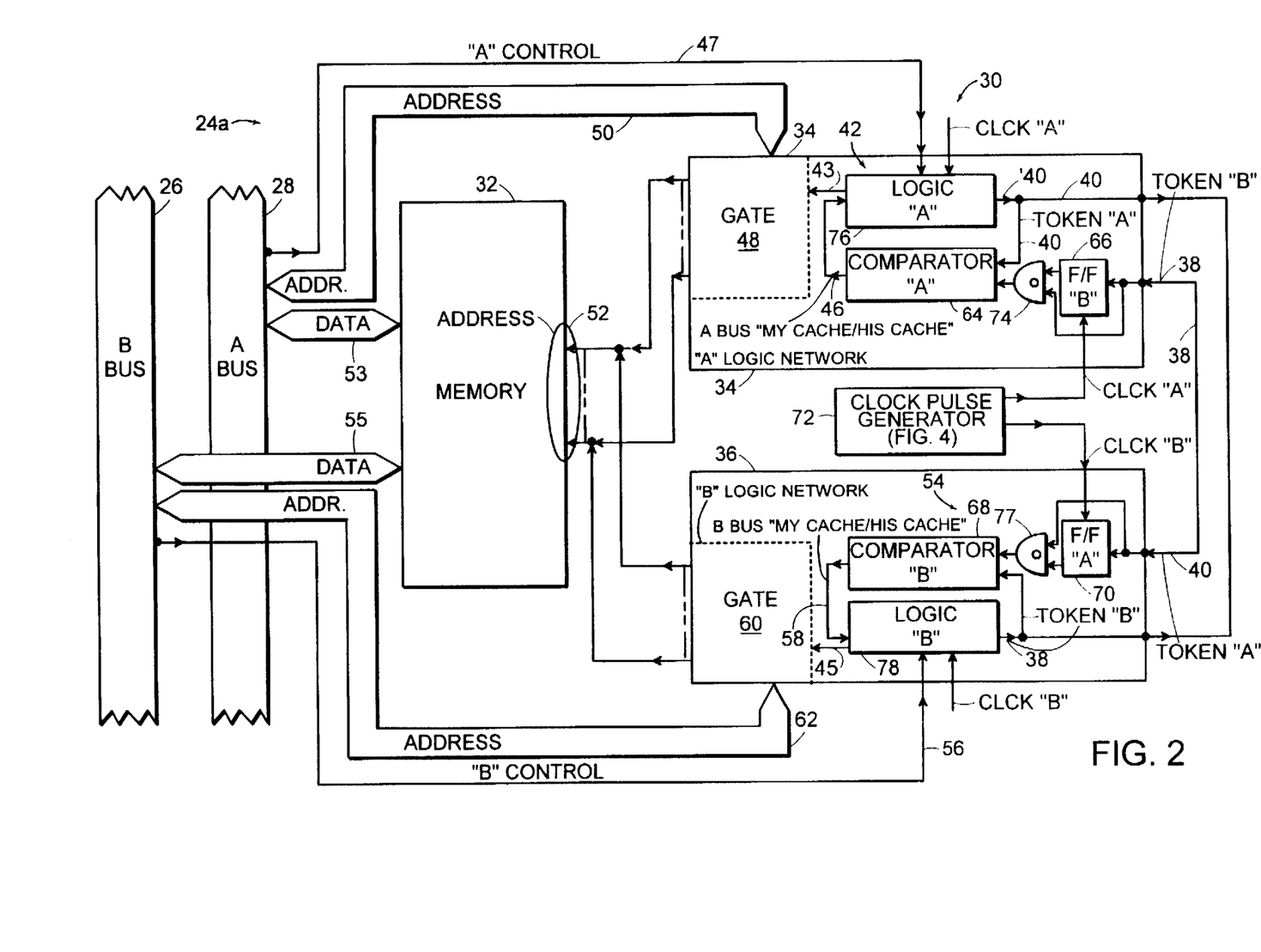
FIG. 2 is a more detailed block diagram of one of the cache memory systems used in the computer system of FIG. 1, such block diagram including a block diagram of bus arbitration system used therein.

Referring to FIG. 2, an exemplary one of the cache memories 24, here cache memory 24a, is shown to include a bus availability system 30 for enabling data to be transferred between a random access memory (RAM) 32 and either one of the pair of buses 26, 28. The bus availability system 30 including a pair of logic networks 34, 36. "A" Logic network 34 is adapted to enable data to be transferred between the memory 32 and the A bus 28 when an A bus availability signal is produced on Token B line 38. The "A" Logic network 34 also provides a B bus availability signal on Token A line 40 when the memory 32 is available to transfer data the between B bus 26. Likewise, "B" Logic network 36 is adapted to enable data to be transferred between the memory 32 and the B bus 26 when the B bus availability signal is produced on Token B line 40. The "B" Logic network 36 also provides the A bus availability signal on Token B line 38 when the memory 32 is available to transfer data between the B bus 26.

More particularly, "A" Logic network 34 includes: an arbitration and address select section 42 fed by the A bus availability signal on Token B line 38 and an A bus control signal on A Control line 44 from the A bus 28. The signal on the A control line 44 is used when the memory 32 is requested by the A bus 28. When the signals on lines 38 and 40 indicate that the memory 32 is available to transfer data between itself and the A bus 28. "A" Logic network 34 produces a "My_Cache" signal on A Bus "My_Cache/His_Cache" line 46. Logic "A" 76 is fed by the bus control signal on A Bus Logic "My_Cache/His_Cache" line 46 and A control line 44. If: (1) A control line 44 indicates a request for data transfer between bus A 28 and the cache memory 32 (such request being stored into logic "A" 76 in response to clock pulses on line CLCK "A", shown in FIG. 3C and produced by a clock pulse generator 72 (FIG. 4)); and, (2) if a "My_Cache" signal is produced on line 46 (such "My_Cache" signal on line 46 indicating that memory 32 is available to transfer data between itself and the A bus 28), then Logic "A" 76 produces a gating signal on line 43. The gating signal on line 43 is fed to gate 48. Gate 48, in response to the gating signal on line 43, enables a transfer of data between memory 32 and bus A 28. That is, in response to the gating signal on line 43, gate 48 enables address signals on bus 50 to pass through gate 48 to the address terminals 52 of the memory 32. When addressed, data is transferred between the A bus 28 and the memory 32 via data bus 53. In the absence of such gating signal on line 46 (i.e., when a "His_Cache" signal is produced on line 46), gate 48 prevents the address signals on bus 50 from the A bus 28 from passing through gate 48 to the address terminals 52 of the memory 32 and data is prevented from being transferred between the A bus 28 and the memory 32.

Likewise, "B" Logic network 36 includes an arbitration and address select section 54 fed by the B bus availability signal on Token A line 40 and a B bus control signal on B Control line 56 from the B bus 26. The signal on the B control line 56 is used when the memory 32 is requested by the B bus 26. When the signals on lines 40 and 56 indicate that the memory 32 is available to transfer data between itself and the B bus 26, "B" Logic network 36 produces a "My_Cache" signal on B Bus "My_Cache/His_Cache" line 58. Logic "B" 78 is fed by the bus control signal on B Bus Logic "My_Cache/His_Cache" line 58 and a B control line 56. If: (1) B control line 56 indicates a request for data transfer between bus B 26 and the memory 32 (such request being stored into logic "B" 78 in response to clock pulses on line CLCK "B", shown in synchronism with the clock pulses on line CLCK "A" in FIG. 3C and produced by a clock pulse generator 74); and (2) a "My_Cache" signal is produced on line 58 (such "My_Cache" signal on line 58 indicating that memory 32 is available to transfer data between itself and B bus 26), then Logic "B" 78 produces a gating signal on line 45. The gating signal on line 45 is fed to gate 60. Gate 60, in response to the gating signal on line 45, enables a transfer of data between memory 32 and B bus a 26. That is, in response to the gating signal on line 45, gate 60 enables address signals on bus 62 to pass through gate 60 to the address terminals 52 of the memory 32. When addressed, data is transferred between the B bus 26 and the memory 32 via data bus 55. In the absence of such gating signal on line 58 (i.e., when the "His_Cache" signal is produced on line 58), gate 60 prevents the address signals on bus 62 from passing through gate 60 to the address terminals 52 of the memory 32 and data is prevented from being transferred between the B bus 26 and the memory 32.

The arbitration and address select section 42 of "A" Logic network 34 includes: a comparator 64 for producing the signal on A Bus "My_Cache/His_Cache" line 46 in response to the B bus availability signals on Token B line 38 and Token A line 40, respectively. Likewise, arbitration and address select section 54 of "B" Logic network 36 includes: comparator 68 for producing the signal on B Bus "My_Cache/His Cache" line 58 in response to the A bus availability signals on Token B line 38 and Token A line 40, respectively.

More particularly, arbitration and address select section 42 of "A" Logic network 34 includes: flip/flop 66 fed by the B bus availability signal on Token B line 38 and clock pulses on line CLCK "A" produced by a clock pulse generator 72 (to be described in detail in FIG. 4); and an AND gate 74 fed by the B bus availability signal on Token B line 38 and the output of flip/flop 66. The AND gate 74 provides a first input for the comparator 64. A logic gate 76, fed by the signal produced by the comparator 64 on A Bus "My_Cache/His_Cache" line 46 and the A Bus control signal on line 44, provides the A bus availability signal on Token A line 40. The A bus availability signal on Token A line 40 also provides the second input for comparator 64.

Likewise, arbitration and address select section 54 of "B" Logic network 36 includes: flip/flop 70 fed by the A bus availability signal on Token A line 40 and clock pulses on line CLCK "B" produced by the clock pulse generator 72; and an AND gate 76 fed by the A bus availability signal on Token A line 40 and the output of flip/flop 70. The AND gate 77 provides a first input for the comparator 68. A logic gate 78, fed by the signal produced by the comparator 68 on B Bus"My_Cache/His_Cache" line 58 and the B Bus control signal on line 56 provides the B bus availability signal on Token B line 38. The B bus availability signal on Token B line 38 also provides the second input for comparator 68.

In operation, and referring also to FIGS. 3A - 3G, FIG. 3A shows an exemplary time history of the Token "A" line 40.

Here, it is assumed that memory 32 initially has access to the A bus 28. This condition is noted in FIGS. 3F and 3G which show comparator 64 in a "My_Cache" condition and comparator 66 is in a "His Cache" condition, as indicated. That is, initially comparator 64 is in a logic state which produces a "My_Cache" signal on line 46 indicating that the memory 32 has access to the A bus 28 and comparator 68 produces a "His_Cache" signal on line 58 indicating that the memory 32 has access to the A bus 28. Thus, Logic "A" is allowed to access the cache memory 32, if needed. If accessed by the signal on A control line 44. Thus, the signals on lines 46, 58 enable the address signals on bus 50 to pass through enabled gate 48 to address the memory 32 and disable gate 60 to thereby inhibit the address signals on bus 62 from passing through gate 60 to address the memory 32.

Figure 3A:
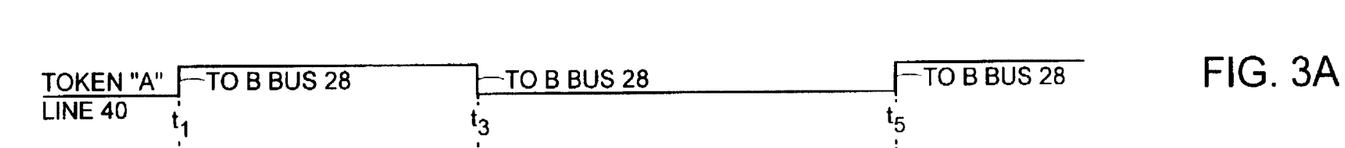
Figures 3B, 3C:
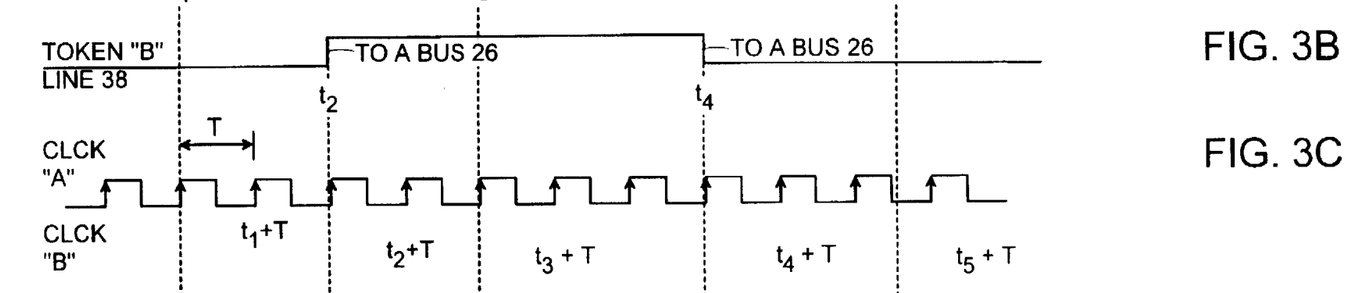
Figure 3D:
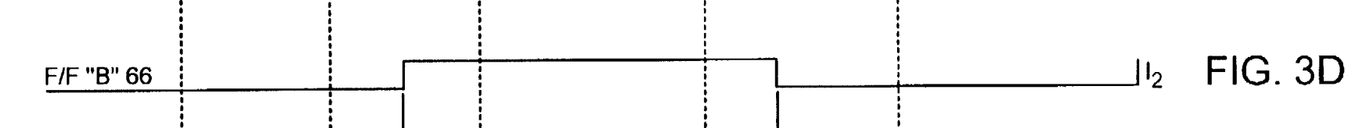
Figures 3E, 3F, 3G:
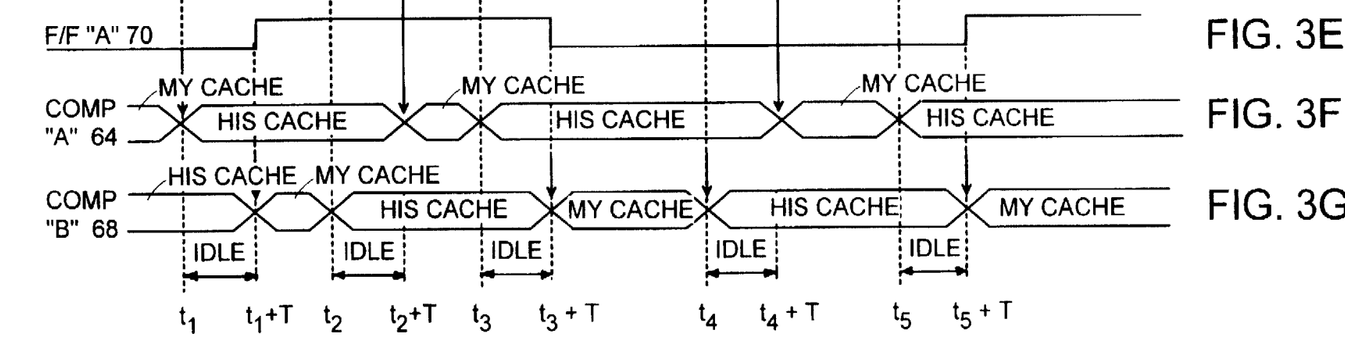

It is first assumed that the clock pulses on CLCK "A" line and CLCK "B" line are synchronized, i.e., in-phase with each other, as shown in FIG. 3C. At time $t_1$, the Token A line 40 changes logic state indicating that the memory 32 is finished with its need to access the A bus 28 and relinquishes the memory 32 to B bus 26. The logic signal on the Token A line 40 thus changes state thereby changing the state of comparator 64 to a "His_Cache" condition. When the state of comparator 64 changes (FIG. 3F), the memory 32 no longer has access to the A bus 28 (nor does it have access to the B bus 26 because the state of comparator 68 has not changed at this time, $t_1$ and remains in the "His_Cache" condition). After a one clock pulse delay (FIG. 3C), the changed logic state on the Token A line 40 becomes stored in flip/flop 70, as shown in FIG. 3E. When the state of flip/flop 70 changes the state of comparator 68 changes to the "My_Cache" condition thereby enabling, via the signal on line 58, the Logic "B" 78 produces a gating signal on line 45 and thereby enables cache memory 32 to memory 32 to have access to the B bus 26, if needed. (Thus, it is noted that during the interval between time $t_1$ and $t_1+T$, where T is one clock period, both the A bus 28 and the B bus 26 are idle with respect to memory 32.)

At time $t_2$, the logic state on the Token "B" line 38 changes indicating that the memory 32 no longer requires access to the B bus 26. Thus, at time $t_2$, the state of comparator 68 changes to the "His_Cache" condition and the gate 60 decouples the address bus 62 from the address terminals 52 of the memory 32. It is also noted that at time $t_2$ memory 32 does not have access to the A bus 28 because of the logic state of the signal produced by comparator 64 has not changed from the "His_Cache" condition. After one clock pulse, however, i.e., $t_2+T$, the state of flip/flop 66 changes, as shown in FIG. 3D and, in response thereto, the state of comparator 64 changes to the "My_Cache" condition thereby producing a gating signal on line 46 to Logic "A" 76. If a signal is produced on A control line 44 (i.e., if bus A 28 needs the memory 32, gate 48 couples the address signals on bus 50 to the address terminals 52 of the memory 32. (Thus, it is noted that during the interval between time $t_2$ and $t_2+T$ both the A bus 28 and the B bus 26 are idle with respect to memory 32.)

In like manner, the logic state of the Token A line 40 changes at times $t_3$, $t_5$ and the logic state of the B control line 56 changes at intervening time $t_4$. Thus, the memory 32 has access to the A bus at times $t_4+T$ and the memory 32 has access to the B bus 26 at times $t_3+T$ and $t_5+T$, as indicated in FIGS. 3F and 3G. (It is also noted that during the interval between time $t_3$ and $t_3+T$, $t_4$ and $t_4+T$, $t_5$ and $t_5+T$ both the A bus 28 and the B bus 26 are idle with respect to memory 32.)

Figure 4:
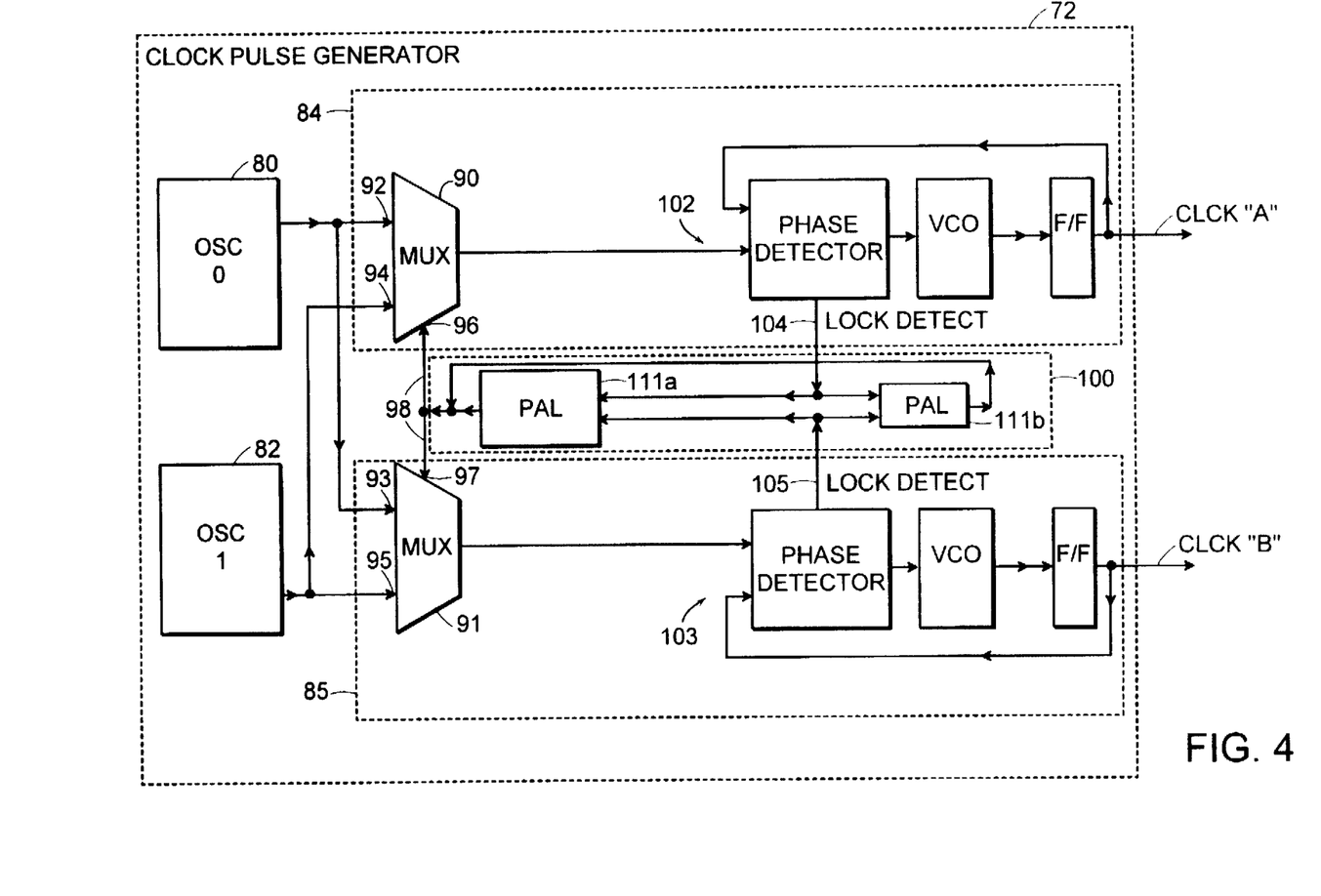
FIG. 4 is a block diagram of a clock pulse generator used in the bus arbitration system of FIG. 2.
Figures 5A, 5B:
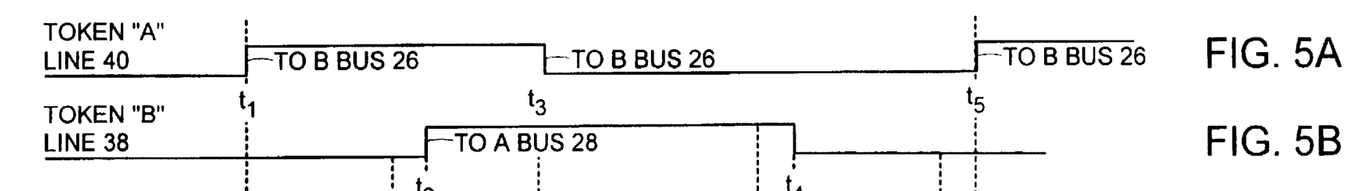
Figure 5C:
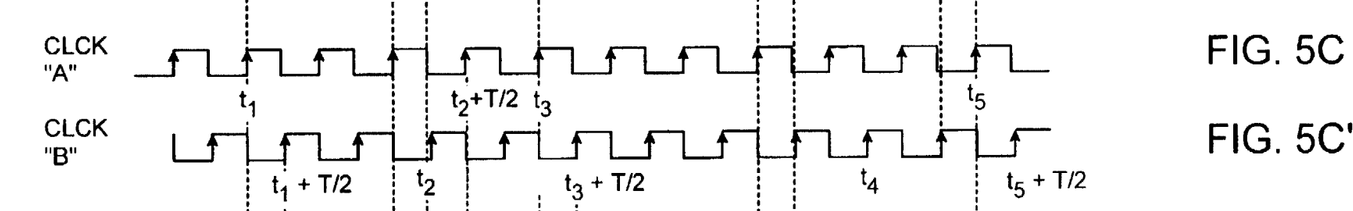
Figure 5D:
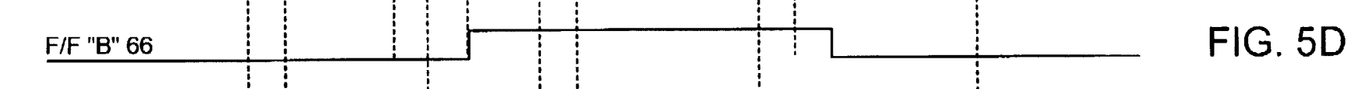
Figure 5E:
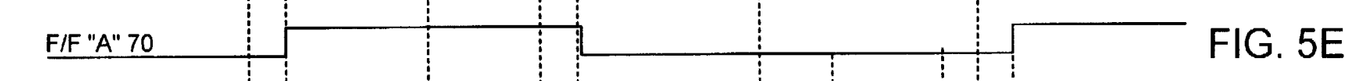
Figures 5F, 5G:
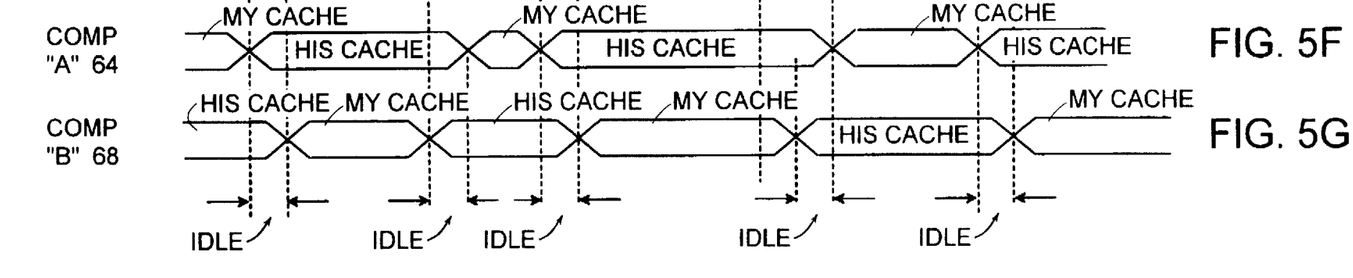

Considering now the case where the clock pulses on line CLCK "A" are not in-phase with the clock pulses on CLCK "B" line, reference is made to FIGS. 5A–5G, where FIG. 5C shows the clock pluses on the CLCK "A" line out-of-phase, here 180 degrees out-of-phase, with the clock pulses on the CLCK "B" line (FIG. 5C). It should be noted that the flip/flops 66, 70 and AND gates 74, 76 provide the one clock pulse delay and thereby provide synchronization between the pair of clock pulses on lines CLCK A, CLCK B if such clock pulses are not in-phase with each other. It should also be noted that the clock pulses, CLCK A, CLCK B, are shown in-phase with each other in FIG. 3C and therefore FIG. 3C shows the clock pulses fed to both flip/flops 66, 70 as being the same clock pulses. However, as will be described in connection with FIG. 4, the clock pulses for flip/flops 66, 76 are produced on separate lines CLCK A, CLCK B, respectively, as shown in FIG. 2, and may, at times, not be in-phase, as shown in FIGS. 5C and 5C', for reasons to be described in detail in connection with FIG. 4.

Referring now to FIG. 4, the clock pulse generator 72 is shown in more detail. The clock pulse generator 72 produces the in-phase clock pulse on lines CLCK A and CLCK B. The clock pulse generator 72 includes: a pair of oscillators 80, 82; a pair of networks 84, 85 for producing the clock pulses on both output lines CLCK A, CLCK B, from one of the pair of oscillators 80, 82 and when such one of the pair of oscillators 80, 82 becomes defective, producing such clock pulses on both output lines CLCK A, CLCK B from the other one of the pair of oscillators 80, 82. More particularly, the networks 84, 85 include: multiplexers 90, 91, respectively, having: a first inputs 92, 93, respectively, fed by a first one of the pair of oscillators 80, 82, here oscillator 80, as shown; second inputs 94, 95, respectively, fed the other one of the pair of oscillators 80, 82, here oscillator 82, as shown; and, control signal inputs 96, 97, respectively, fed by a control signal on lines 98, as shown. The multiplexers 90, 91 feed signals from either the first oscillator 80 or the second oscillator 82 to the outputs thereof to enable one of the oscillators to serve as the source of the clock pulses on both output lines CLCK A, CLCK B. The one of the oscillators 80, 82 passed to the outputs of the multiplexers 90, 91 is selected in accordance with the control signal on line 98. A network 100 is provided for producing the control signal on line 98. Thus, let it be assumed that, initially, oscillator 80 is coupled to the outputs of the multiplexers 90, 91 and thereby produces the clock signals on both lines CLCK A, CLCK B. When oscillator 80 becomes defective, the network 100 changes the logic state of the control signal on line 98 to decouple the oscillator 80 from the outputs of the multiplexers 90, 91 and to couple oscillator 82 to the outputs of the multiplexers 90, 91. Thus, now oscillator 82 serves as the source of the clock pulses on both line CLCK A and line CLCK B. Likewise, if oscillator 82 was coupled to the outputs of multiplexers 90, 91, a defect in such oscillator 82 would result in network 100 changing the logic state of the signal on line 98 to decouple oscillator 82 from the outputs of multiplexers 90, 91 and to couple a replaced, operative oscillator 80 to the outputs of multiplexers 90, 91.

More particularly, the network 84 includes a phase lock loop (PLL) 102, here an MC88915TFN series PLL manufactured by Motorola, Inc., having a phase detector, voltage controlled oscillator (VCO) and flip/flop arranged as shown. The PLL 102 is fed by the signal produced at the output of the multiplexer 90 and an output signal of the phase lock loop 102 itself. The phase lock loop output signal produces the clock pulses on line CLCK A and a lock signal on line 104 when the signal fed to the phase lock loop 102 from multiplexer 90 is phase locked with the phase lock loop 102 output signal and an unlock signal on line 104 when the signal fed to the phase lock loop 102 from multiplexer 90 loses phase lock with the phase lock loop 102 output signal. The lock/unlock signal on line 104 is fed to a pair of programmable array logic gates (PALS) 111a, 111b, as shown, included in network 100.

Likewise, the network 85 includes a phase lock loop 103, here also an MC88915TFN series PLL manufactured by Motorola, Inc., having a phase detector, voltage controlled oscillator (VCO) and flip/flop arranged as shown. The PLL 103 is fed by the signal produced at the output of the multiplexer 91 and an output signal of the phase lock loop 103 itself. The phase lock loop 103 output signal produces the clock pulses on line CLCK B and a lock signal on line 105 when the signal fed to the phase lock loop 103 from multiplexer 91 is phase locked with the phase lock loop 103 output signal and an unlock signal on line 105 when the signal fed to the phase lock loop 103 from multiplexer 91 loses phase lock with the phase lock loop 103 output signal. The lock/unlock signal on line 105 is fed to the pair of PALs 111a, 111b included in network 100. The outputs of PALs 111a, 111b are connected to the control line 98 in anopen collector arrangement. It should be noted that two PALS 111a, 111b are provided for redundancy.

In operation, let it be assumed that oscillator 80 is functioning properly and is selected to produce pass through the multiplexers 90, 91 to serve as the source of the clock pulses on both lines CLCK A, CLCK B. A lock signal is produced on lines 104, 105 to maintain this condition. If oscillator 80 fails, an unlock signal is produced on lines 104, 105 and network 100 changes the state of the control signal on line 98 to thereby decouple oscillator 80 from the outputs of multiplexers 90, 91 and to couple oscillator 82 to the outputs of multiplexers 90, 91 to produce pass through the multiplexers 90, 91 and serve as the source of the clock pulses on both lines CLCK A, CLCK B.

More particularly, when an unlock signal is produced on either line 104 or 105, the PALS 111a, 111b, respectively change the logic state of the signal produced on line 98 and the input selected to pass to the outputs of multiplexers 90, 91 change. Thus, here if oscillator 80, which was initially passed to the outputs of multiplexers 90, 91 fails an unlock signal is produced on lines 104, 105 and PALs 111a, 111b cause oscillator 82 to pass to the outputs of multiplexers 90, 91. Thus, now oscillator 82 serves as the source for producing the clock signals on both line CLCK A and line CLCK B. That is, the unlock signal produced on lines 104, 105 when oscillator 80 fails, decouples failed oscillator 80 from the system 10. Therefore, in order to provide for redundancy, the clock pulse generator 72 includes two independent oscillators 80, 82 and, for additional redundancy in the case of the failure of one of the PLLs 102, 103, two independent phase lock loop networks 84, 85 are provided. It should be noted that during the transition between oscillators 80, 82 there are no "glitches" produced on CLCK "A" or CLCK "B" lines because of the smoothing, or filtering action of the analog PLLs 102, 103. That is, the analog, feedback control circuitry provided by PLLs 102, 103 provides filtering between the switching action of the multiplexers 90, 91 thereby preventing "glitches" passing to the CLCK A and CLCK B lines. However, the clock pulses on lines CLCK "A" and CLCK "B" may, for a time be out-of-phase (i.e., out of synchronization) with each other during the switching process. As noted above, flip/flops 66, 70 are provided to maintain system synchronization. That is, the clock pulses on line CLCK "A" are fed to Logic "A" 76 and the clock pulses on line CLCK "B" are fed to "B" Logic 78. However, even if the clock pulses on line CLCK "A" are not synchronized with the clock pulses on line CLCK "B", the flip/flops 66, 70 maintain synchronized transfer of the cache memory 32 between bus A 28 and bus B 26 as described in connection with FIGS. 5A–5G.

Other embodiments are within the spirit and scope of the appended claims.

What is claimed is:

1. A data storage system, comprising:
   a pair of buses;
   a memory;
   a bus availability system for enabling data to be transferred between the memory and either one of the pair of buses, such system including a pair of logic networks;
   a first one of the pair of logic networks being adapted to enable data to be transferred between the memory and a first one of the buses in response to a first bus availability signal and for providing a second bus availability signal indicating when the memory is available to transfer data between such memory and the second one of the buses; and,
   a second one of the pair of logic networks being adapted to enable data to be transferred between the memory and the second one of the buses in response to the second bus availability signal and for providing the first bus availability signal indicating when the memory is available to transfer data between such memory and the first one of the buses.

2. The data storage system recited in claim 1 wherein the first one of the pair of logic networks includes:
   an arbitration and address select section, fed by the first bus availability signal and a first bus control signal from the first bus, for producing a first bus gating signal indicating the memory is available to transfer data between the first bus;
   a gate fed by the first bus gating signal for feeding the address signals from the first bus to the memory in response to the first bus gating signal.

3. The data storage system recited in claim 2 wherein the second one of the pair of logic networks includes:
   an arbitration and address select section, fed by the second bus availability signal and a second bus control signal from the second bus, for producing a second bus gating signal indicating the memory is available to transfer data between the second bus;
   a gate fed by the second bus gating signal for feeding the address signals from the second bus to the memory in response to the second bus gating signal.

4. The data storage system recited in claim 3 wherein the first one of the pair of logic networks includes:
   a first comparator for producing a control signal in response to the first and second bus availability signals, such control signal being fed to the arbitration and address select section.

5. The data storage system recited in claim 4 wherein the second one of the pair of logic networks includes:
   a second comparator for producing a control signal in response to the first and second bus availability signals, such control signal being fed to the arbitration and address select section.

6. The data storage system recited in claim 5 wherein the first one of the pair of logic networks includes:
   a first flip/flop fed by the first bus availability signal and clock pulses;
   a first AND gate, fed by the first bus availability signal and the output of the first flip/flop, such AND gate providing a first input for the first comparator;

and wherein the arbitration and address select section includes a first logic gate fed by the first comparator and the first bus control signal, for providing the [first] second bus availability signal, such signal providing a second input for the first comparator.

7. The data storage system recited in claim 6 wherein the address select section of the second one of the pair of logic networks includes:

a second flip/flop fed by the second bus availability signal and clock pulses;

a second AND gate, fed by the second bus availability signal and the output of the second flip/flop, such AND gate providing a first input for the second comparator;

and wherein the arbitration and address select section includes a second logic gate fed by the second comparator and the second bus control signal, for providing the first bus availability signal, such signal providing a second input for the second comparator.

8. The data storage system recited in claim 7 including a clock pulse generator for producing the clock pulse, such clock pulse generator comprising:

a pair of oscillators;

a network for producing clock pulses on an output of the pulse generator from one of the pair of oscillators and when such one of the pair of oscillators becomes defective, producing such clock pulses on such output from the other one of the pair of oscillators, such network including:

a multiplexer having: a first input fed a first one of the pair of oscillators; a second input fed the other one of the pair of oscillators; and, a control signal input fed by a control signal, such multiplexer feeding signals from either the first oscillator or the second oscillator to an output of the multiplexer selectively in accordance with the control signal;

a network for coupling one of the first one of the pair of oscillators to the output of the multiplexer to produce the clock signals and when such one of the first one of the pair of oscillators is defective producing the control signal to decouple the first one of the pair of oscillators from the output of the multiplexer and to couple the other one of the pair of oscillators to the output of the multiplexer to provide the clock pulses.

9. The clock pulse generator recited in claim 8 wherein the network includes a circuit for detecting a defect in the first one of the oscillators and for producing the control signal in response to such defect detection.

10. The clock pulse generator recited in claim 9 wherein the network includes a phase lock loop fed by the signal produced at the output of the multiplexer.

11. The clock pulse generator recited in claim 10 wherein the phase lock loop is fed by the signal at the output of the multiplexer and an output signal of the phase lock loop, such phase lock loop output signal producing the clock pulses, such phase lock loop producing a lock signal when the signal fed to the phase lock loop is phase locked with the phase lock loop output signal and an unlock signal when the signal fed to the phase lock loop loses phase lock with the phase lock loop output signal, such lock and unlock signals providing the control signal for the multiplexer.

12. The data storage system recited in claim 8 including a clock pulse generator for producing the clock pulse, such clock pulse generator, comprising:

a first oscillator;

a second oscillator;

a first phase lock loop section, comprising:

a first multiplexer having a pair of inputs fed by the first and second oscillators, respectively, and a control signal input fed by a control signal for coupling one of the oscillators to an output of the multiplexer selectively in accordance with the control signal;

a phase lock loop fed by the one of the oscillators coupled to the output of the multiplexer for producing a first clock signal locked in phase with the one of the oscillators fed thereto and for producing a first lock signal when the clock signal is phase locked;

a second phase lock loop section, comprising:

a second multiplexer having a pair of inputs fed by the first and second oscillators, respectively, and a control signal input fed by the control signal for coupling the one of the oscillators fed to the first phase lock loop to the output of the multiplexer;

a second phase lock loop fed by the one of the oscillators coupled to the output of the second multiplexer for producing a second clock signal locked in phase with the one of the oscillators fed thereto and for producing a second lock signal when the second clock signal is phase locked;

a network for producing the control signal in response to the first and second lock signals.

13. A method for enabling data to be transferred between a memory and either one of a pair of buses, comprising:

transferring data between the memory and a first one of the buses in response to a first bus availability signal and providing a second bus availability signal indicating when the memory is available to transfer data between such memory and the second one of the buses; and, transferring data between the memory and the second one of the buses in response to the second bus availability signal and for providing the first bus availability signal indicating when the memory is available to transfer data between such memory and the first one of the buses.

* * * * *